(12) United States Patent
Zedell et al.

(10) Patent No.: US 7,722,982 B2
(45) Date of Patent: May 25, 2010

(54) BATTERY PACK HAVING NON-ORTHOGONAL COUPLING SLOTS

(75) Inventors: Karl Zedell, Alpharetta, GA (US); Wooi Heong Chew, Pul (MY); Yoshitaka Matsuzawa, Atlanta, GA (US); Mark C. Taraboulos, Chamblee, GA (US); Swee Theam Thor, Pul (MY)

(73) Assignee: Motorola, Inc., Schaumburg, IL (US)

( * ) Notice: Subject to any disclaimer, the term of this patent is extended or adjusted under 35 U.S.C. 154(b) by 1364 days.

(21) Appl. No.: 11/122,915

(22) Filed: May 5, 2005

(65) Prior Publication Data

US 2006/0251964 A1    Nov. 9, 2006

(51) Int. Cl.
*H01M 2/10*    (2006.01)
(52) U.S. Cl. .............................. 429/97; 429/96; 429/99; 429/151; 429/163; 429/176
(58) Field of Classification Search .................. None
See application file for complete search history.

(56) References Cited

U.S. PATENT DOCUMENTS

| | | | |
|---|---|---|---|
| 5,059,885 A * | 10/1991 | Weiss et al. | 320/115 |
| 5,366,826 A | 11/1994 | McCormick et al. | |
| 5,626,979 A * | 5/1997 | Mitsui et al. | 429/97 |
| D398,605 S | 9/1998 | Murray et al. | |
| 6,521,370 B1 * | 2/2003 | Takeshita et al. | 429/96 |
| 2002/0025455 A1 | 2/2002 | Yoneyama | |
| 2003/0194603 A1 * | 10/2003 | Kim | 429/125 |

FOREIGN PATENT DOCUMENTS

| | | |
|---|---|---|
| DE | 19541305 A1 | 5/1997 |
| GB | 2115601 A | 9/1983 |
| JP | 61085767 A | 5/1986 |

OTHER PUBLICATIONS

PCT/US2006/013830, PCT Search Report and Written Opinion, mailed Jul. 26, 2006, 8 pages.
Chinese Patent Office, Chinese Application No. 200680015412.6, Office Action [translated], Rejection, Feb. 6, 2009, 3 pages.

\* cited by examiner

*Primary Examiner*—Jonathan Crepeau
*Assistant Examiner*—Tony Chuo
(74) *Attorney, Agent, or Firm*—Hisashi David Watanabe; Anthony P. Curtis

(57) ABSTRACT

This invention includes a battery pack having an improved battery retention system for coupling to another device, like a desktop charger. The battery pack, which includes one rechargeable cell and optional circuitry, has an exterior housing that is generally rectangular in cross section. The exterior housing, which includes major faces and intersection seams, has at least two female slots that project inward at an angle that is non-orthogonal to the major faces or intersection seams. These non-orthogonal slots, when coupling to corresponding non-orthogonal rails in the pocket of a battery charger, allow batteries of various sizes to be inserted into a single charger pocket with reliable and consistent electrical connections between the electrical contacts of the pocket and the charging terminals of the battery. Electrical contacts may be disposed within the non-orthogonal slots, thereby improving both the function and aesthetic appearance of the battery pack.

22 Claims, 9 Drawing Sheets

BATTERY PACK HAVING NON-ORTHOGONAL COUPLING SLOTS

BACKGROUND

1. Technical Field

This invention relates generally to rechargeable battery packs, and more specifically to a rechargeable battery pack having non-orthogonal coupling slots to retain the battery pack in an electrical apparatus, such as a battery charger.

2. Background Art

Portable electronic devices, like two-way radios and mobile phones for example, owe their portability to rechargeable battery packs. Rechargeable battery packs conveniently supply power to these portable devices without the need for wires, plugs or electrical outlets. In other words, when using a mobile device with a rechargeable battery pack, the user may take the device anywhere—at any time—without the need of being continually tethered to a wall outlet.

Rechargeable battery packs typically include one or more rechargeable electrochemical cells that store and deliver electrical energy. These electrochemical cells, which may be coupled to circuitry within the pack for charging or safety, must be recharged when depleted to remain functional. While charging may be accomplished by simply plugging a wired connector from a power supply into the battery pack, many people prefer the convenience of desktop chargers to facilitate the recharging process. When using a desktop charger, the user simply inserts either a spare rechargeable battery pack or electronic device itself into the charger. The charger then detects the presence of the battery or device and begins to recharge the cells in accordance with a predetermined charging procedure. Batteries and devices for industrial use, like the two-way radios used by fire and police departments, typically stand vertically within the charger when charging. The radio, standing in this vertical position, remains easily accessible and visible to the user.

To keep these large batteries from tipping over when charging, some manufacturers have incorporated battery retention systems into the chargers and their corresponding rechargeable battery packs. One example of a prior art battery retention system can be seen in FIGS. 1 and 2. FIG. 1 illustrates a perspective view of a battery pack 100 with such a prior art battery retention system, while FIG. 2 illustrates a cross-sectional view of the battery pack 100.

In this prior art battery retention system, the battery pack 100 is equipped with two channels 102, or slots, which run lengthwise along the battery pack housing on opposite sides of the battery pack 100. These channels 102 are perpendicular to the opposing sides upon which they are disposed.

A battery charger for this battery 100, which includes a pocket into which the battery 100 may be inserted for charging, would include two rails disposed on opposite sides of the pocket. The two rails are disposed in such a manner that when the battery pack 100 is inserted into the pocket, the two rails are aligned with the channels 102 of the battery pack 100. The alignment of the rails with the channels 102 ensures that electrical contacts disposed within the pocket of the charger couple securely and consistently with charging contacts 101 disposed on the battery pack 100.

The problem with this prior art battery retention system is that some batteries, often made for the same radio, are thicker than others. Consequently, for the fixed ribs and slots of this prior art retention system the pocket of the charger must be bigger than the smallest battery. Were this not the case, the largest battery could not be charged in the charger. This problem can be seen in FIG. 3.

In FIG. 3 a charger pocket 300 having rails 301 and a back member 302 is shown. To accommodate multiple size batteries, the back member 302 must be sufficiently far from the rails 301 so as to accommodate the maximum thickness of the battery extending from the slots 102. As can be seen from FIG. 3, when a smaller battery 100 is inserted into the pocket 300, the slots 102 and rails 301 align as previously described. Since the back 103 of the battery 100 does not extend all the way to the back 302 of the charger pocket 300 when the slots 102 and rails 301 align, there will be a gap 303 between the back 103 of the battery 100 and the back 302 of the charger pocket 300. If the electrical contacts in the pocket extend through openings in the back 302 of the pocket 300, the gap 303 may become sufficiently large that the electrical contacts do not connect with the charger contacts of the battery pack 100. In such a scenario, reliable recharging of the battery pack 100 could be compromised.

A second problem arises when battery packs become smaller and smaller. To get the same amount of energy from a smaller battery pack, designers will reduce the thickness of the plastic exterior housing. In so doing, the thickness of the plastic exterior housing may be reduced to such an extent that slots can no longer accommodated. Since the charger-to-battery connection relies upon the rail-to-slot connection, designers must add extra plastic about the base edges of the battery pack just to accommodate the slots. These bumps of extra plastic material, often referred to as "rocket boosters", can make the overall appearance of the battery pack unsightly.

There is thus a need for an improved battery housing having a contact retention system that accommodates battery packs of varying thicknesses and does not require the use of extra material on the exterior of the battery pack housing.

DETAILED DESCRIPTION OF THE INVENTION

Figure 1:
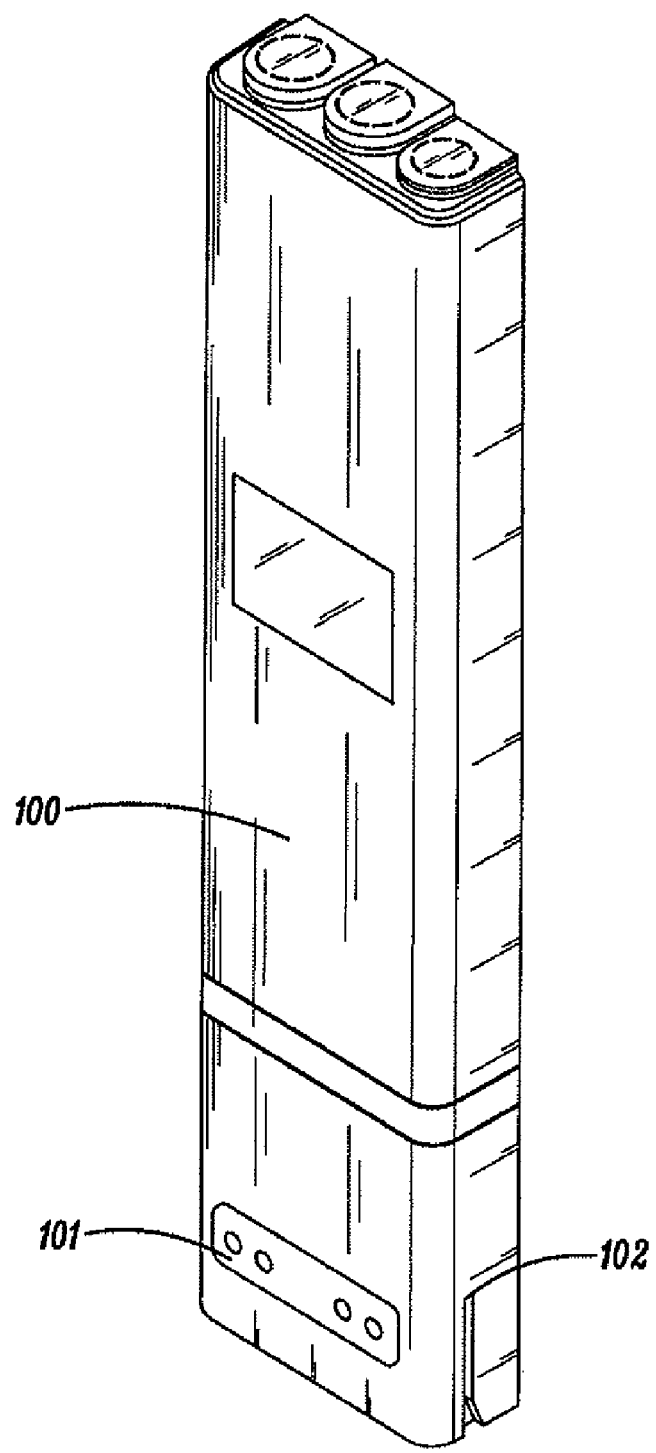
FIG. 1 illustrates a perspective view of a prior art battery pack.
Figure 2:
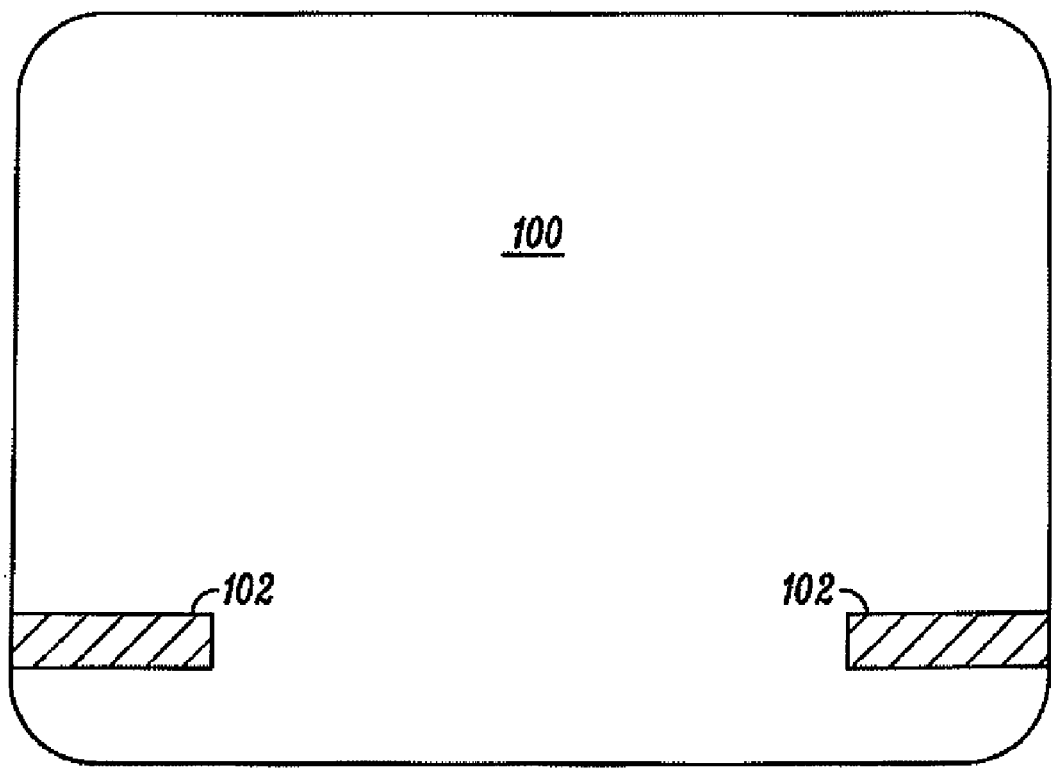
FIG. 2 illustrates a sectional view of a prior art battery pack.
Figure 3:
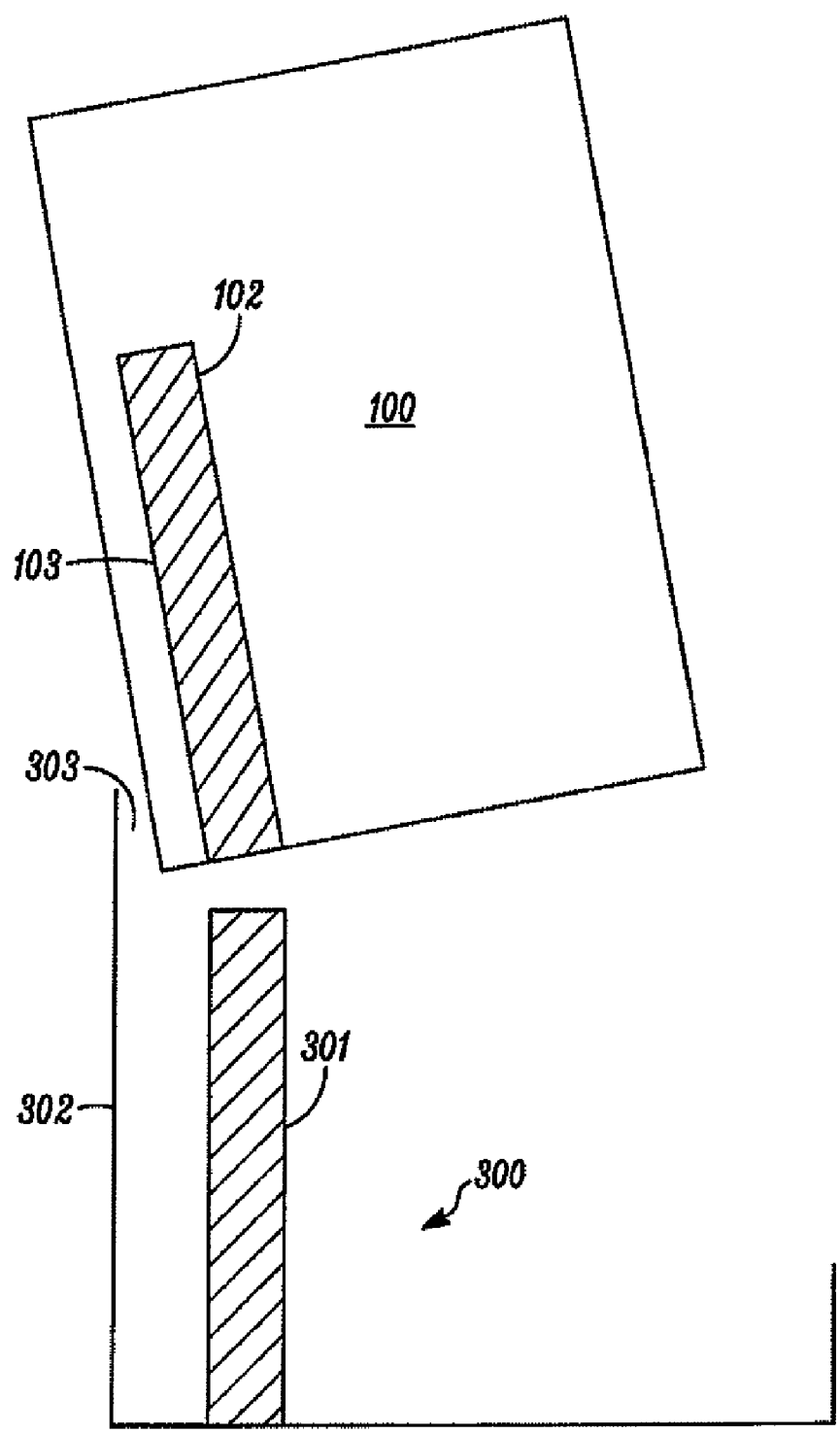
FIG. 3 illustrates a prior art battery pack and corresponding charger pocketing having a prior art battery retention system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides a battery pack with an improved battery retention system. The battery pack includes at least one rechargeable cell disposed within the pack. The battery pack has an exterior housing, which in one preferred embodiment has a cross-section that is generally rectangular in shape. The exterior housing includes a pair of female slots that project inward from the outer surfaces of the exterior housing at an angle that is non-orthogonal to either the sides or major faces of the battery pack.

The pair of female slots, which may be disposed on a single face, on multiple faces, or on multiple edges allows a battery charger pocket to accommodate batteries of varying thickness without any gaps existing between the back of the battery pack and the back of the charger pocket. Additionally, where the electrochemical cells within the battery pack are cylindrical, and where the female slots are disposed on the edges, there is no need to add additional plastic to the battery pack to accommodate the slots. As such, the rocket booster problem is resolved.

In one preferred embodiment, electrical contacts are disposed within the female slots. By disposing electrical contacts within the female slots, the invention offers numerous advantages of the prior art, including reducing the possibility of a user touching the electrical contacts, since the contacts are recessed (within the female slots). Additionally, overall battery pack aesthetics are improved as the electrical contacts are effectively "hidden" within the female slots. Next, safety and reliability may be increased due to the increased spacing between the various electrical contacts disposed within the female slots.

Figure 4:
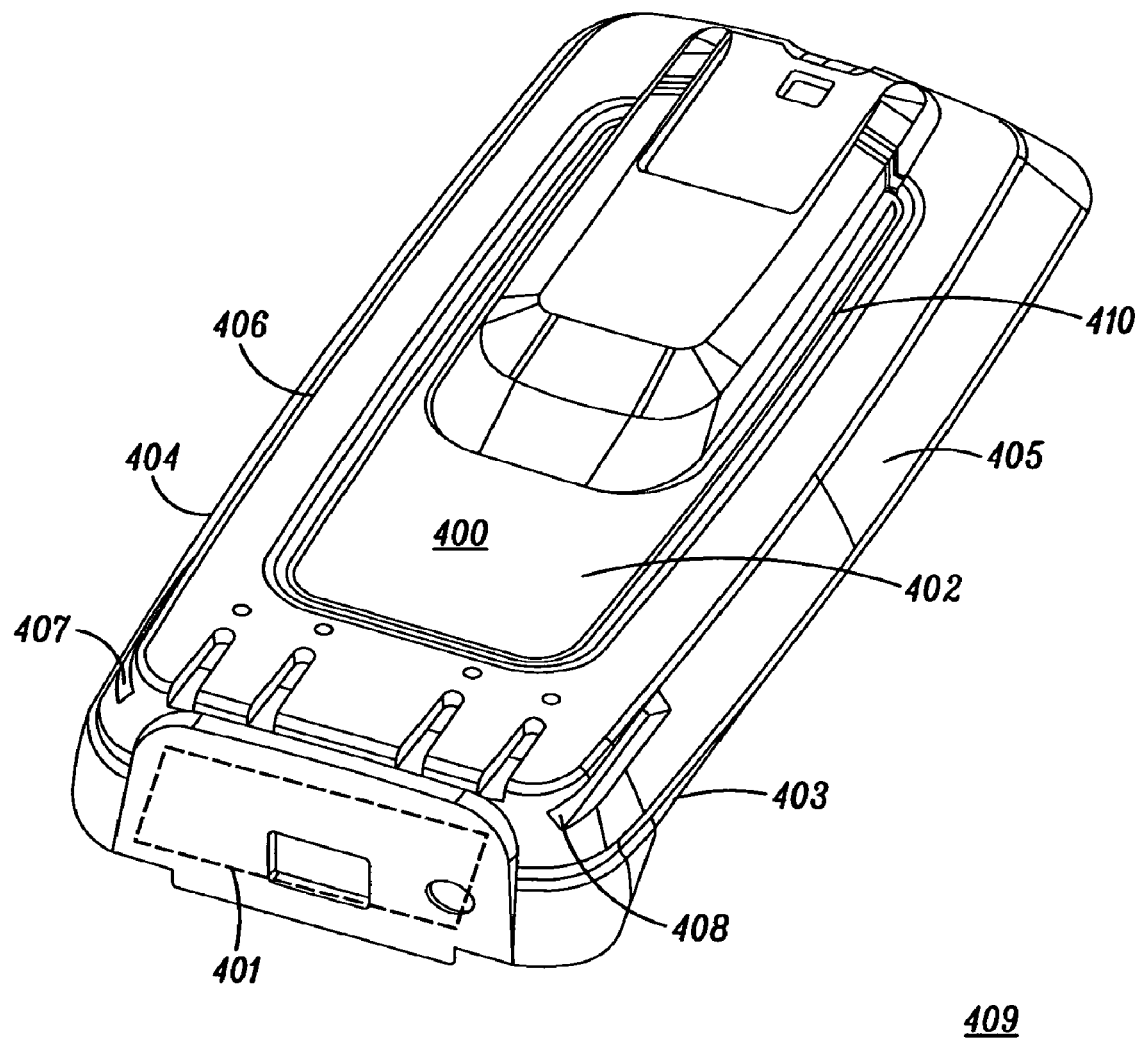
FIG. 4 illustrates a perspective view of one preferred embodiment of a battery pack with an improved battery retention system in accordance with the invention.

Turning now to FIG. 4, illustrated therein is one preferred embodiment of a battery pack 400 having an improved battery retention system in accordance with the invention. The battery pack 400, which includes major surfaces or faces, and intersection seams where these faces meet, has a generally rectangular cross section as is represented by dashed line 401.

Note that as used herein, "generally rectangular cross section" is intended to refer to any battery pack having two major faces with substantially equal lengths and two secondary faces with substantially equal lengths, regardless of subtle curvatures and other design elements disposed about the exterior surface of the battery pack. For example, the battery pack of FIG. 4 includes various bulges 409 and indentions 410, but maintains an overall substantially rectangular cross section as is indicated by dashed line 401.

The battery pack 400 includes four major faces and four intersection seams. As can be seen from the perspective view of FIG. 4, face 402 is one major face, face 403 is a second major face, face 404 is a third major face, and a face opposite face 402 would comprise a fourth major face. Edge 405 and edge 406 are examples of intersection seams which are created by the intersection of the major faces 402-404. By way of example, intersection seam 405 is formed at the intersection of major face 402 and major face 403. The battery pack may also include various bulges and indentions 410 as well.

In the exemplary embodiment of FIG. 4, a pair of female slots 407, 408 are disposed along the exterior battery housing. In this particular embodiment, the pair of female slots 407, 408 are disposed along intersection seams 406 and 405, respectfully. It will be clear to one of ordinary skill in the art having the benefit of this disclosure, however, that the invention is not so limited. For instance, the pair of female slots 407, 408 could be disposed along a single face, like that of major face 402. Additionally, the pair of female slots 407, 408 could be disposed along opposing major faces, for example major face 404 and major face 403.

Depending upon where the female slots 407,408 are located, various housing elements will provide separation between the slots 407,408. For example, turning again to the exemplary embodiment of FIG. 4, female slot 407 is disposed along intersection seam 406 as noted in the preceding paragraph. Similarly, female slot 408 is disposed along intersection seam 405. As such, intersection seam 406 is separated from intersection seam 405 by major face 402. Note that if the pair of female slots 407,408 was disposed on adjacent major faces, for example major face 404 and major face 402, the female slots 407 and 408 would then be separated by an intersection seam, like intersection seam 406 for instance. Similarly, if the pair of female slots 407, 408 were disposed on opposing major faces, like major face 404 and major face 403, the pair of female slots 407,408 would then be separated by a major face 402 and two intersection seams 406,405.

As shown in the embodiment of FIG. 4, the pair of female slots 407, 408 project inward from the exterior housing at an angle that is non-orthogonal to any major face of the generally rectangular cross section. By way of example, female slot 408 projects at an angle towards the center of the rectangle indicated by dashed line 401, such that the angle of projection of female slot 408 is non-orthogonal with either major face 400 or major face 403. Similarly, female slot 407 projects inward at an angle that is not orthogonal to either major face 402 or major face 404. In one preferred embodiment the female slots 407, 408 project inward at an angle of between 30 and 60 degrees from major face 402. It is this non-orthogonal projection into the battery pack that allows the battery retention system of the present invention to facilitate multiple battery sizes in a single charger pocket without compromising the charger contact to battery contact connection.

Figure 5:
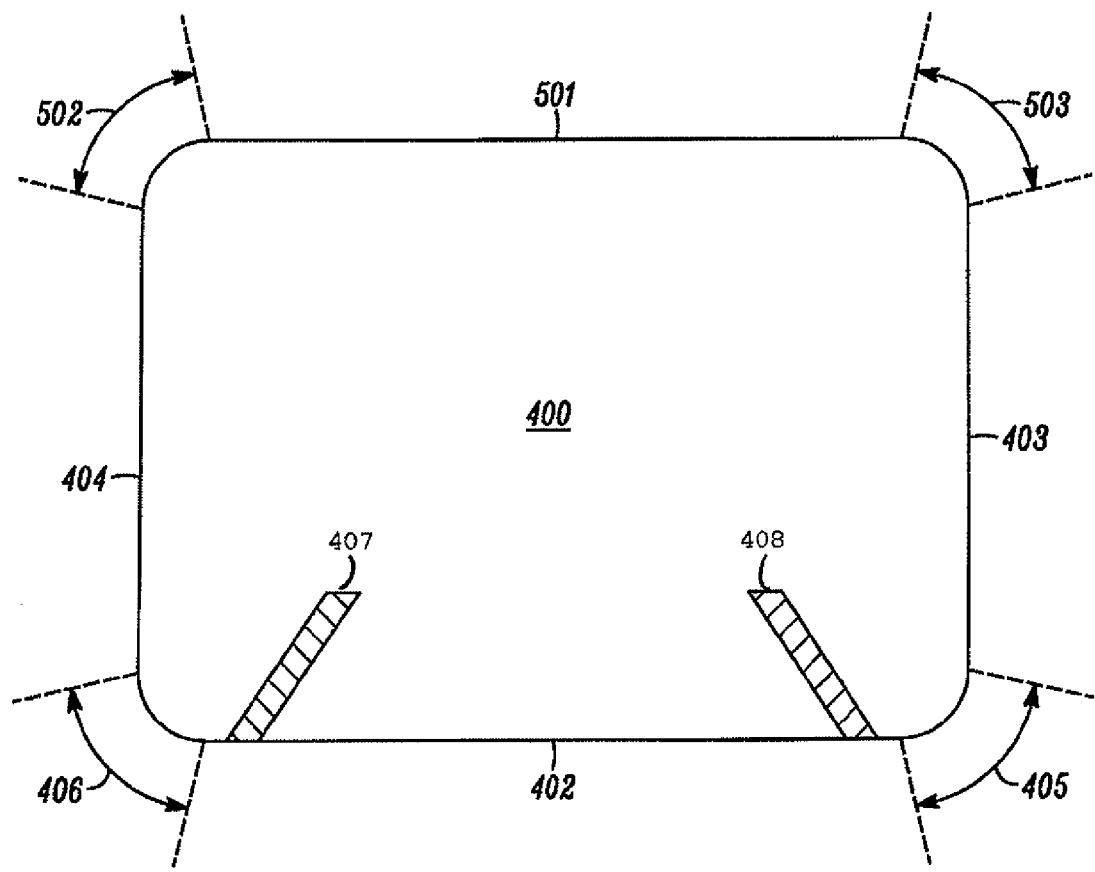
FIG. 5 illustrates one preferred embodiment of a battery pack having an improved battery retention system in accordance with the invention.

Turning now to FIG. 5, illustrated therein is a cross-sectional view of a battery pack 400 having an improved battery retention system in accordance with the invention. In this sectional view, the four major faces 402, 403, 404, 501 may be seen. Additionally, the four intersection seams 405, 406, 502, 503 may also be seen. Note that the intersection seams 405, 406, 502, 503, as illustrated, are curved corners between the major faces 402, 403, 404, 501. The invention, however, is not so limited. The intersection seams may alternatively be straight lines, convex indentions, complex curvatures or multi-segmented steps running from one major face to the next.

Note also that while the sectional view in FIG. 5 illustrates a substantially rectangular cross-section that has substantially flat major faces 402, 403, 404, 501, the invention is not so limited. Any of the major faces may include, for example, chamfers thereby making them curved as opposed to substantially straight.

In the embodiment of FIG. 5, female slot 407 is disposed along intersection seam 406, while female slot 408 is disposed along intersection seam 405. In this embodiment, as illustrated, female seam 407 is separated from female seam 408 by major face 402. As can be seen, female slots 407, 408 project inward from an outer surface (major face 402) on the exterior of the battery 400 at an angle that is non-orthogonal to either the major faces 402, 403, 404, 501 or the intersection seams 405, 406, 502, 503. Specifically, in the embodiment of FIG. 5, the female slots 407, 408 project inward at an angle that is non-orthogonal to major face 402. In one preferred embodiment, female slots 407, 408 project inward at an angle between 30 and 60 degrees relative to major face 402.

Figure 6:
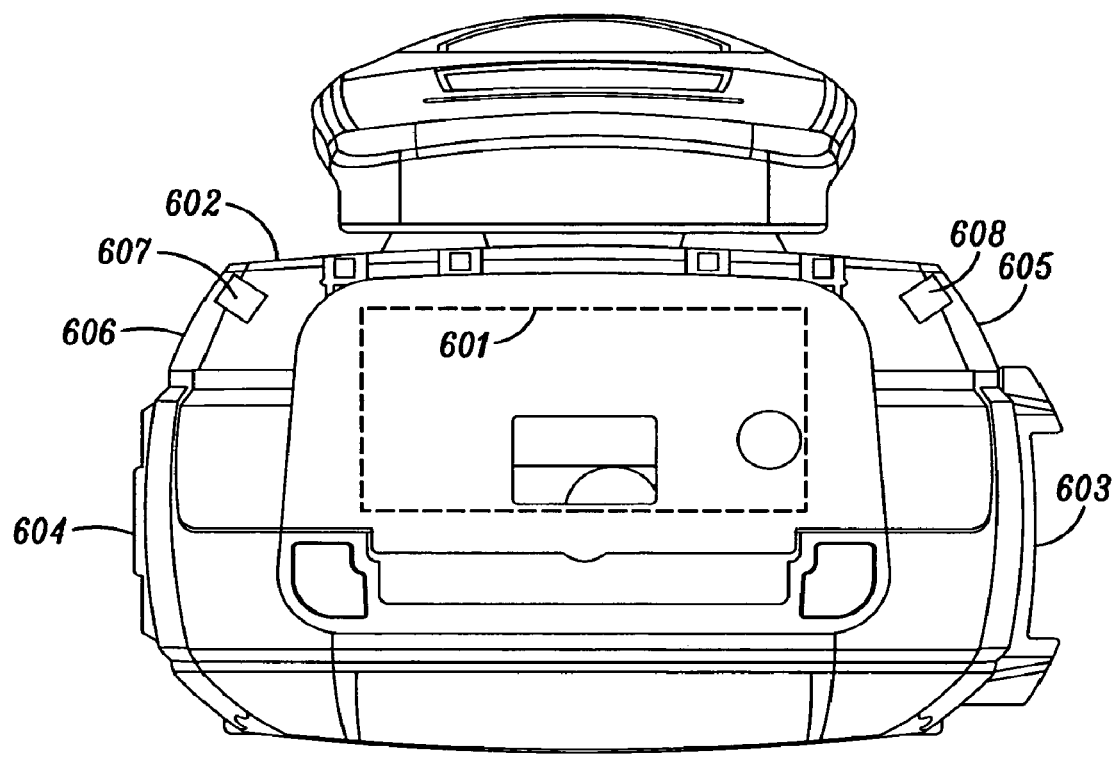
FIG. 6 illustrates another preferred embodiment of a battery pack having an improved battery retention system in accordance with the invention.

Turning now to FIG. 6, illustrated therein is an alternate embodiment of a battery pack 600 having an improved battery retention system in accordance with the invention. As with the embodiment of FIG. 4, the battery pack 600 of FIG. 6 has a substantially rectangular cross section as is indicated by dashed line 601. In the embodiment of FIG. 6, the intersection seams 605, 606 comprise chamfers so as to form curved features flowing between, for example, major face 604 and major face 602 and major face 602 and major face 603, respectively. In this embodiment, the pair of female slots 607, 608 has been disposed along the intersection seams 605,606.

Figure 7:
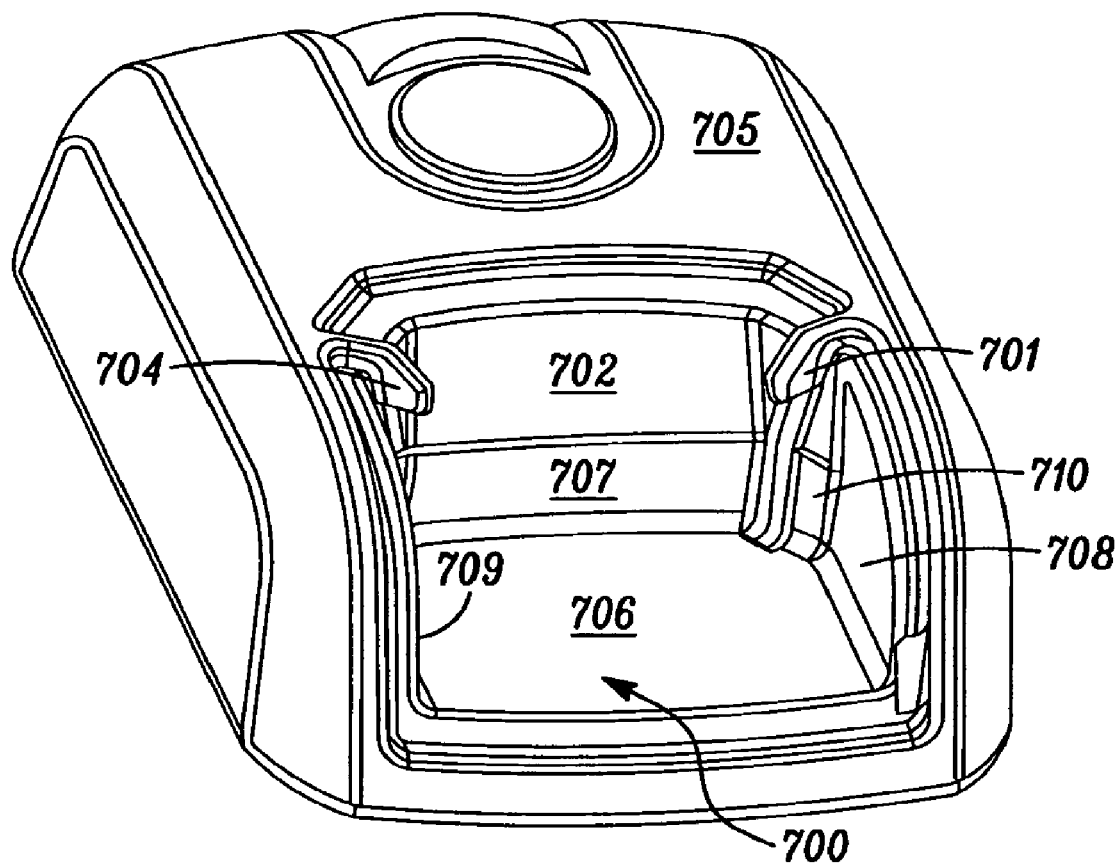
FIG. 7 illustrates one embodiment of a charger for accommodating battery packs having an improved battery retention system in accordance with the invention.

Turning now to FIG. 7, illustrated therein is one preferred embodiment of a desktop charger 705 having an improved battery retention system in accordance with the invention. The charger 705 includes a pocket 700 having a bottom 706 and back 702. In this particular embodiment, the back 702 has been angled with respect to vertical member 707 so as to make battery insertion into the pocket 700 easier. When inserted into the pocket 700, a battery slides along the back 702 until the base of the battery reaches the bottom 706 of the pocket 700.

In accordance with the invention, the pocket 700 includes non-orthogonal rails 701, 704 for mating with the pair of female slots disposed within the exterior housing of the battery pack. Note that the non-orthogonal angle of the rails 701, 704 (with respect to the back 702 and sides 708 and 709) ensures the battery will be retained in the pocket 700 during the charging process. This is due to the fact that the non-orthogonal angle of the rails serves to resist any forces that may be exerted on the battery in a direction that is perpendicular to one of the sides of the pocket. Electrical contacts (not shown) which may be disposed on either the back 702, the bottom 706, or the sides, 708, 709 will be held reliably in contact with the charging contacts of the battery as a result of the coupling of the rails 701, 704 with the pair of female slots disposed in the battery pack.

Figure 8:
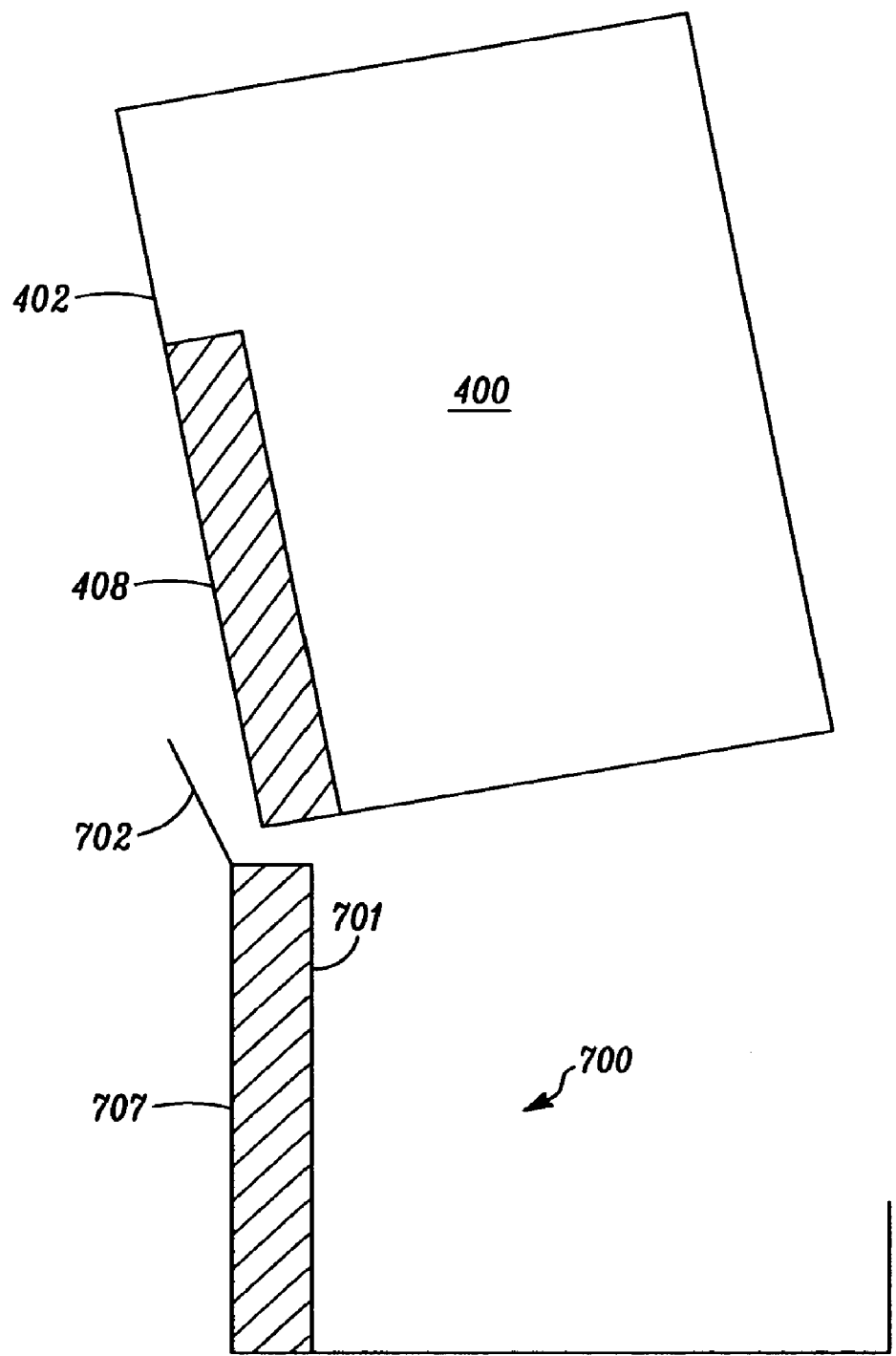
FIG. 8 illustrates the side view of a battery pocket and battery pack having an improved battery retention system in accordance with the invention.

Turning now to FIG. 8 illustrated therein is a side view of a battery pack 400 in accordance with the invention being inserted into a charger pocket 700. Note that the non-orthogonal rails 701 mate with the non-orthogonal female slots 408 when the battery pack 400 slides into the pocket 700. As such, the back of the battery pack 400, represented by major face 402, rests against either the back 702 of the charger pocket 700 or vertical member 707 when the battery pack 400 is inserted in the pocket 700. The non-orthogonal rails 701 and slots 408 enable any battery pack, regardless of size, to securely fit and be held within the pocket 700. Since the back of the battery 402 is held against the back components 702, 707 of the pocket 700 regardless of battery size, no gaps or other misalignments will cause intermittent electrical connections between electrical contacts in the pockets 700 and charging contacts disposed on the battery pack 400.

Figure 9:
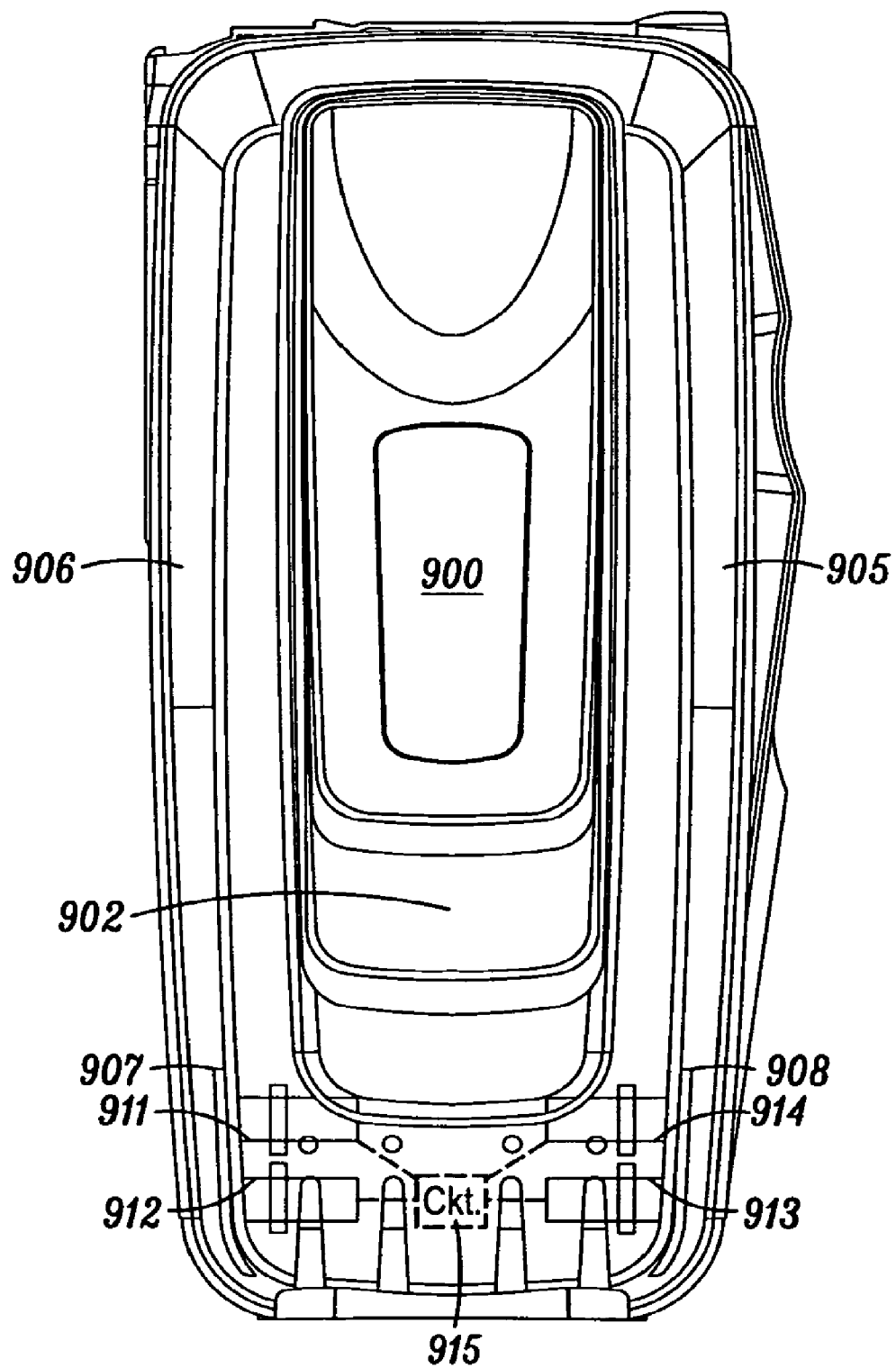
FIG. 9 illustrates one preferred embodiment of a battery pack having an improved battery retention system in accordance with the invention, wherein electrical contacts are disposed within the female slots of the battery pack.

Turning now to FIG. 9 illustrated therein is an alternate embodiment of a battery pack 900 having an improved battery retention system in accordance with the invention. In the embodiment of FIG. 9, electrical contacts 911-914 have been disposed within the pair of female slots 907, 908 while electrical contacts may be disposed on the major faces, for example major face 902, disposing the electrical contacts 911-914 in the pair of female slots 907, 908 offers numerous advantages over the prior art. A first advantage is improved battery aesthetics. Since the electrical contacts 911-914 are hidden within the recesses of the pair of female slots 907, 908 they are not easily seen by the user. As such, the battery pack 908 includes less viewable non-aesthetically pleasing elements.

Additionally, as the electrical contacts 911-914 are disposed along the intersection seams 905, 906 of the battery pack 900, additional separation between, for example electrical contacts 911 and 912 with respect to electrical contacts 913 and 914, is provided. This additional isolation prevents, for example, salt and other impurities found in the air from creating corrosive bridges between the contacts.

A third improvement occurs where the electrochemical cells disposed within the battery pack 900 are cylindrical in shape. Since the pack 900 is generally rectangular in cross section, and since the cells are cylindrical, additional plastic will be located along the intersection seams 905,906 regardless of the thickness of the sides. This is due to the fact that the rectangular cross section of the pack 900 must "wrap around" the cylindrical cells. In any event, utilizing this extra plastic for the slots 907,908 means that there is no need for the rocket boosters required by the prior art.

In this embodiment, electrical contacts 911-914 are coupled to internal circuitry 916, which may include charging circuitry, protection circuitry, fuel gauging circuitry or other battery related circuitry. This circuitry may be coupled to the rechargeable cells and may, for example, ensure that the cells are properly charged and discharged.

To summarize the invention, a battery pack having an improved battery retention system is provided. The battery pack includes at least one rechargeable electrochemical cell disposed within the pack. Optional electrical circuitry may be coupled to the at least one rechargeable cell, the electrical circuitry being likewise disposed within the battery pack. An exterior housing having at least one major face and at least two intersection seams houses the cell(s) and circuitry. The housing, which may be made from a plastic such as ABS or polycarbonate by way of an injection molding process, is generally rectangular in cross section. In accordance with the invention, at least two female slots, which project inward from the exterior housing at an angle that is non-orthogonal with at least one of the major faces, ensure that the battery pack makes a reliable connection with electrical contacts in a charger.

The at least two female slots may be disposed along the intersection seams. They may additionally be disposed along any of the major faces. Electrical contacts may be disposed within the female slots.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A battery pack, comprising:
at least one rechargeable cell disposed within the pack; and
an exterior housing having a cross section that is generally rectangular in shape such that the exterior housing includes four major faces and four intersection seams, the four major faces including a first major face, a second major face, a third major face, and a fourth major face, the four intersection seams including a first intersection seam and a second intersection seam, each of the four intersection seams joining a pair of the four major faces,
wherein the exterior housing comprises a pair of female slots each projecting inward from an outer surface of the exterior housing at an angle that is non-orthogonal to each of the major faces, the pair of female slots disposed along at least one of the four major faces or at least one of the four intersection seams, the pair of female slots including a first female slot and a second female slot, and wherein the pair of female slots project inward away from the outer surface of the exterior housing along a constant angle from the outer surface of the exterior housing to an inner end of the slots.

2. The pack of claim 1, wherein the pair of female slots is disposed along one of the four major faces.

3. The pack of claim 1, wherein the first female slot is disposed along the first major face and the second female slot is disposed along the second major face.

4. The pack of claim 3, wherein at least one of the first major face or the second major face comprises a chamfer.

5. The pack of claim 3, wherein the first major face and the second major face are separated by only one of the intersection seams.

6. The pack of claim 3, wherein the first major face and the second major face are separated by a pair of the intersection seams and the third major face.

7. The pack of claim 1, wherein the first female slot is disposed along the first intersection seam and the second female slot is disposed along the second intersection seam.

8. The pack of claim 7, wherein the first intersection seam and the second intersection seam are separated by the first major face.

9. The pack of claim 8, wherein at least one of the first or second intersection seams is non-orthogonal with the first major face.

10. The pack of claim 1, further comprising electrical contacts disposed within the pair of female slots.

11. The pack of claim 1, wherein each slot has uniform dimensions along the entire slot extending from the outer surface of the exterior housing to an inner end of the slot disposed within an interior of the cross-section.

12. The pack of claim 1, wherein the slots project inward toward each other.

13. A battery pack comprising:
at least one rechargeable electrochemical cell disposed within the battery pack;
electrical circuitry coupled to the at least one rechargeable electrochemical cell;
an exterior housing comprising at least one major face, a top, a bottom, and at least two intersection seams;
at least two female slots projecting inward from the exterior housing from one or more of the at least one major face or the intersection seams;
wherein the at least two female slots each project inward away from the exterior housing at an angle that is non-orthogonal with all major faces of the exterior housing, and the pair of female slots project inward along a constant angle from an outer surface of the exterior housing to an inner end of the slots.

14. The pack of claim 13, wherein the at least two female slots are disposed along the at least two intersection seams.

15. The pack of claim 14, wherein a first of the at least two female slots is disposed along a first of the at least two intersection seams, further wherein a second of the at least two female slots is disposed along a second of the at least two intersection seams.

16. The pack of claim 15, wherein the at least two intersection seams are separated by the at least one major face.

17. The pack of claim 16, further comprising electrical contacts disposed within the at least two female slots.

18. The pack of claim 13, wherein the at least two female slots are disposed along the at least one major face.

19. The pack of claim 18, further comprising electrical contacts disposed within the at least two female slots.

20. The pack of claim 13, wherein the pack comprises at least three major faces, further wherein a first of the at least two female slots is disposed along a first of the at least three major faces, further wherein a second of the at least two female slots is disposed along a second major face, further wherein the first and second major faces are separated by a third major face.

21. The pack of claim 20, further comprising electrical contacts disposed within the at least two female slots.

22. The pack of claim 13, wherein the slots project inward toward each other.

* * * * *

UNITED STATES PATENT AND TRADEMARK OFFICE
CERTIFICATE OF CORRECTION

PATENT NO. : 7,722,982 B2  
APPLICATION NO. : 11/122915  
DATED : May 25, 2010  
INVENTOR(S) : Zedell et al.

Page 1 of 1

It is certified that error appears in the above-identified patent and that said Letters Patent is hereby corrected as shown below:

On the title page, item (75), under "Inventors", in Column 1, Line 2, delete "Pul" and insert -- Penang, --, therefor.

On the title page, item (75), under "Inventors", in Column 1, Line 5, delete "Pul" and insert -- Bayan Lepas, --, therefor.

Signed and Sealed this  
First Day of January, 2013

David J. Kappos  
*Director of the United States Patent and Trademark Office*